(12) United States Patent
Cocchi et al.

(10) Patent No.: US 11,641,862 B2
(45) Date of Patent: *May 9, 2023

(54) MACHINE AND METHOD FOR MAKING AND DISPENSING LIQUID, SEMI-LIQUID AND/OR SEMI-SOLID FOOD PRODUCTS

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,775

(22) Filed: Jan. 30, 2018

(65) Prior Publication Data

US 2018/0153188 A1   Jun. 7, 2018

Related U.S. Application Data

(62) Division of application No. 15/606,735, filed on May 26, 2017, now Pat. No. 10,772,341, which is a
(Continued)

(30) Foreign Application Priority Data

May 24, 2013  (IT) .............................. BO2013A0260
Feb. 28, 2014  (IT) .............................. BO2014A0098

(51) Int. Cl.
*A23G 9/14*   (2006.01)
*A23G 9/28*   (2006.01)
(Continued)

(52) U.S. Cl.
CPC .................. *A23G 9/14* (2013.01); *A23G 9/16* (2013.01); *A23G 9/163* (2013.01); *A23G 9/166* (2013.01);
(Continued)

(58) Field of Classification Search
CPC ... A23G 9/00–9/52; A23G 9/30–9/305; A23G 9/228; A23G 9/14; A23G 9/16;
(Continued)

(56) References Cited

U.S. PATENT DOCUMENTS 2,784,565 A * 3/1957 Stalkup .................... A23G 9/16
                                                              62/125
2,961,853 A   11/1960 Cohrt
(Continued)

FOREIGN PATENT DOCUMENTS

CN   1388854 A   1/2003
CN   2621434 Y   6/2004
(Continued)

OTHER PUBLICATIONS

International Search Report and Written Opinion dated Sep. 17, 2014 from related PCT Application No. PCT/IB2014/061586.
(Continued)

*Primary Examiner* — Drew E Becker
(74) *Attorney, Agent, or Firm* — Shuttleworth & Ingersoll, PLC; Timothy Klima

(57) ABSTRACT

A machine for making and dispensing liquid, semi-liquid and/or semi-solid food products and which includes at least a cylinder for containing and processing basic products, means for heating and cooling the cylinder wrapped around at least part of the cylinder and a mixer unit positioned inside the cylinder which is able to mix the basic products during their processing; the machine also includes a supply duct for supplying the products into the cylinder, a dispensing duct for withdrawing the food products from the cylinder and means for recirculating the products contained in the containment and processing cylinder which are able to withdraw the products from the cylinder through the dispensing duct and to return them into the cylinder through the supply duct.

17 Claims, 4 Drawing Sheets

Related U.S. Application Data division of application No. 14/892,832, filed as application No. PCT/IB2014/061586 on May 21, 2014, now Pat. No. 9,693,571.

(51) Int. Cl.
- *A23G 9/16* (2006.01)
- *A23G 9/30* (2006.01)
- *A23G 9/22* (2006.01)

(52) U.S. Cl.
CPC .............. *A23G 9/22* (2013.01); *A23G 9/28* (2013.01); *A23G 9/281* (2013.01); *A23G 9/305* (2013.01)

(58) Field of Classification Search
CPC .......... A23G 9/163; A23G 9/166; A23G 9/22; A23G 9/28; A23G 9/281; A23C 3/02–3/0375; A23L 3/02–3/245
USPC ................................ 426/524, 521–522, 232
See application file for complete search history.

(56) References Cited

U.S. PATENT DOCUMENTS

| | | | |
|---|---|---|---|
| 2,975,617 A * | 3/1961 | Wakeman | A23G 9/20 62/342 |
| 3,029,613 A | 4/1962 | Lande et al. | |
| 3,117,695 A | 1/1964 | Cox, Jr. | |
| 3,729,177 A | 4/1973 | Keyes et al. | |
| 3,811,494 A * | 5/1974 | Menzel | A23G 9/04 165/65 |
| 3,829,242 A * | 8/1974 | Duke | A23G 9/20 417/38 |
| 3,898,859 A * | 8/1975 | Duke | A23G 9/12 62/135 |
| 3,930,535 A | 1/1976 | Menzel | |
| 3,989,492 A | 11/1976 | Keyes | |
| 4,479,423 A | 10/1984 | Schwitters et al. | |
| 4,522,041 A * | 6/1985 | Menzel | A23G 9/04 165/122 |
| 4,607,494 A * | 8/1986 | Cipelletti | A23G 9/12 62/278 |
| 4,625,525 A | 12/1986 | Bradbury et al. | |
| 4,680,944 A * | 7/1987 | Menzel | A23G 9/163 165/61 |
| 4,703,628 A | 11/1987 | Togashi et al. | |
| 4,848,381 A | 7/1989 | Livingston et al. | |
| 4,860,550 A | 8/1989 | Aoki et al. | |
| 4,964,542 A | 10/1990 | Smith | |
| 5,016,446 A | 5/1991 | Fiedler | |
| 5,096,092 A | 3/1992 | Devine | |
| 5,201,861 A | 4/1993 | Menzel | |
| 5,447,371 A | 9/1995 | Agapiou | |
| 5,503,064 A | 4/1996 | Scheel et al. | |
| 5,615,559 A * | 4/1997 | Kress | A23G 9/16 62/136 |
| 5,692,392 A | 12/1997 | Swier | |
| 5,799,832 A | 9/1998 | Mayo | |
| 5,962,035 A * | 10/1999 | Masse | A23G 3/2015 425/131.1 |
| 6,142,340 A | 11/2000 | Watanabe et al. | |
| 6,189,440 B1 | 2/2001 | Amundson | |
| 6,490,872 B1 * | 12/2002 | Beck | A23G 9/045 62/303 |
| 6,494,055 B1 | 12/2002 | Meserole et al. | |
| 7,640,755 B1 | 1/2010 | Kateman | |
| 7,681,761 B2 | 3/2010 | Harra | |
| 8,316,761 B2 | 11/2012 | Bravo et al. | |
| 8,479,531 B2 | 7/2013 | Maeda | |
| 8,758,678 B2 | 6/2014 | Cocchi et al. | |
| 9,402,408 B2 | 8/2016 | Cocchi et al. | |
| 9,693,571 B2 * | 7/2017 | Cocchi | A23G 9/14 |
| 2002/0162577 A1 | 11/2002 | Cocchi | |
| 2003/0080138 A1 * | 5/2003 | Chirnomas | G07F 5/18 221/123 |
| 2004/0003620 A1 | 1/2004 | Cocchi et al. | |
| 2004/0035640 A1 | 2/2004 | Barnard et al. | |
| 2004/0251270 A1 | 12/2004 | Davis et al. | |
| 2005/0098575 A1 | 5/2005 | Carhuff et al. | |
| 2005/0103213 A1 * | 5/2005 | Dumm | A23C 3/031 99/483 |
| 2005/0269362 A1 | 12/2005 | Guerrero et al. | |
| 2006/0024418 A1 | 2/2006 | White et al. | |
| 2006/0185755 A1 | 8/2006 | Vaughn | |
| 2006/0240159 A1 | 10/2006 | Cash et al. | |
| 2006/0243310 A1 | 11/2006 | Cocchi et al. | |
| 2006/0261086 A1 | 11/2006 | Schroeder et al. | |
| 2007/0102448 A1 | 5/2007 | Harra | |
| 2007/0114228 A1 * | 5/2007 | Cocchi | A23G 9/305 219/679 |
| 2007/0275131 A1 | 11/2007 | Bertini et al. | |
| 2008/0295865 A1 | 12/2008 | Ahn | |
| 2009/0258120 A1 * | 10/2009 | Zeitler | B67D 1/0888 426/232 |
| 2010/0101235 A1 | 4/2010 | Cocchi et al. | |
| 2012/0251697 A1 * | 10/2012 | Cocchi | A23G 9/045 426/521 |
| 2013/0064034 A1 | 3/2013 | Almblad et al. | |
| 2013/0140328 A1 | 6/2013 | Gates et al. | |
| 2014/0134299 A1 * | 5/2014 | Guidorzi | A47J 31/44 426/87 |
| 2014/0335232 A1 | 11/2014 | Beth Halachmi | |
| 2015/0245634 A1 | 9/2015 | Lazzarini et al. | |
| 2019/0110498 A1 * | 4/2019 | Minard | A23G 9/28 |
| 2019/0150471 A1 * | 5/2019 | Wadle | A23G 9/305 |

FOREIGN PATENT DOCUMENTS

| | | |
|---|---|---|
| CN | 1780785 A | 5/2006 |
| CN | 101175412 A | 5/2008 |
| CN | 101263838 A | 9/2008 |
| CN | 101731427 B | 6/2010 |
| CN | 101790319 A | 7/2010 |
| CN | 102726590 A | 10/2012 |
| EP | 0170766 | 1/1985 |
| EP | 369846 A2 | 5/1990 |
| EP | 701777 A2 | 3/1996 |
| EP | 0729707 A2 | 9/1996 |
| EP | 252420 A1 | 6/2010 |
| EP | 2279669 A2 | 2/2011 |
| EP | 2491792 A1 | 8/2012 |
| GB | 1018232 A | 1/1966 |
| GB | 8501048 | 9/1985 |
| IT | 01268167 | 3/1994 |
| JP | 1291751 | 11/1989 |
| JP | H02107160 A | 4/1990 |
| JP | H0690669 A | 4/1994 |
| JP | H06181732 A | 7/1994 |
| JP | 2001169729 A | 6/2001 |
| JP | 2002017268 A | 1/2002 |
| JP | 2002176930 A | 6/2002 |
| JP | 2002223705 A | 8/2002 |
| JP | 2526372 Y | 7/2003 |
| JP | 2676029 B2 | 7/2003 |
| JP | 2869407 B1 | 7/2003 |
| JP | 4194343 B2 | 7/2003 |
| JP | 4194345 B2 | 7/2003 |
| JP | 4353648 B2 | 7/2003 |
| JP | 4353649 B2 | 7/2003 |
| JP | 4357128 B2 | 7/2003 |
| JP | 56161969 | 7/2003 |
| JP | 2003199508 A | 7/2003 |
| JP | 2006271221 A | 10/2006 |
| JP | 2006523459 A | 10/2006 |
| WO | 9854979 | 12/1998 |
| WO | 9949739 A | 10/1999 |
| WO | WO0121007 A1 | 3/2001 |
| WO | 200409463 | 1/2004 |
| WO | 2004091324 A2 | 10/2004 |
| WO | 2004099001 | 11/2004 |

(56) References Cited

FOREIGN PATENT DOCUMENTS

| WO | WO2009/027757 A1 | 3/2009 |
|----|------------------|--------|
| WO | 2014003881 A1    | 1/2014 |
| WO | 201584388        | 6/2015 |

OTHER PUBLICATIONS

Italian Search Report dated Nov. 11, 2014 for related Application No. BO20140237.
Italian Search Report dated Nov. 11, 2014 from related Italian Application No. BO20140236.
Chinese Office Action dated Apr. 4, 2018 from related Chinese Patent Application No. 201510312036.8.
English translation of Japanese Office Action dated Feb. 7, 2019 for related Japanese Patent Application No. 2015085787.
Japanese Office Action dated Feb. 27, 2019 for related Japanese Patent Application No. JP 2015-085788.
Chinese Office Action dated Aug. 5, 2019 for counterpart Chinese Patent Application No. 201510297164.X.
COLDELITE EF 201/BIB, Lista Ricambl(List of Spare Parts), Machine Code 9770, Tav. 01, Rev. 00, 2013.
COLDELITE EF 201/BIB, Manuale(Instruction Manual), BIB_1I.pm5-Ed.06/98, 2004.

\* cited by examiner ly known as "soft ice cream".
MACHINE AND METHOD FOR MAKING AND DISPENSING LIQUID, SEMI-LIQUID AND/OR SEMI-SOLID FOOD PRODUCTS This application is a divisional of U.S. patent application Ser. No. 15/606,735 filed May 26, 2017, which is a divisional of U.S. patent application Ser. No. 14/892,832 filed Nov. 20, 2015 (now U.S. Pat. No. 9,693,571 issued Jul. 4, 2017), which is a National Phase of International Application PCT/IB2014/061586 filed May 21, 2014. This application claims priority to Italian Patent Application No. BO2013A000260 filed May 24, 2013, and Italian Patent Application No. BO2014A000098 filed Feb. 28, 2014. All of the above applications are incorporated by reference herein.

TECHNICAL FIELD

This invention relates to a machine and a method for making and dispensing liquid, semi-liquid and/or semi-solid food products such as, for example, soft ice cream and the like.

More specifically, this invention relates to machines for making and dispensing soft ice cream where the basic products are contained in sealed containers, such as, for example, containment tanks or containers of the type known as "bag in box".

BACKGROUND ART

Generally speaking, machines for making and dispensing ice cream of this kind comprises a tank for containing the basic products, into which the liquid or semi-liquid ingredients (that is, the liquid or semi-liquid basic products) are fed and where the selfsame basic products are processed.

The containment tank internally comprises a mixer for the basic products which guarantees that the basic products are mixed continuously during processing.

The tank is wrapped in coils through which a heat exchange fluid is made to flow. The heat exchange fluid heats or cools the tank and, consequently, the products therein, according to set thermal cycles.

More specifically, during a thermal cycle for pasteurizing the basic products inside the containment tank, the heat exchange fluid heats the containment tank and, consequently, the products therein to temperatures of between 65° and 85° C.

During this thermal cycle, the mixer continuously stirs the products being processed so that the end product has a smooth, homogeneous consistency.

When the pasteurization cycle is over, the product in the tank is cooled and brought to a temperature of around 4° C. suitable for its storage, thereby obtaining the ice cream.

During the product cooling and storage cycle, the heat exchange fluid cools the containment tank and, consequently, the products therein.

In the ice cream production sector, it is known that good and well carried out pasteurization makes a product of high quality.

In machines of known type, as described above, however, it has been found that during the pasteurization of the basic products inside the containment tank, the product in contact with the tank walls, and more specifically, the walls around which the coils for the heat exchange fluid are wrapped, tends to become very hot, despite the continuous action of the mixer.

Localized burning of the basic product may lead to the formation of lumps in the product, which negatively affect the quality of the basic product being processed in terms of smooth, homogeneous consistency, thus producing a poorer quality ice cream.

DISCLOSURE OF THE INVENTION

The aim of this invention is to overcome the above mentioned disadvantage.

According to the invention, this aim is achieved by a machine and a method for making and dispensing liquid, semi-liquid and/or semi-solid food products.

BRIEF DESCRIPTION OF THE DRAWINGS

The technical features of the invention, with reference to the above aim, are clearly described in the claims below and its advantages are apparent from the detailed description which follows, with reference to the accompanying drawings which illustrate a non-limiting example embodiment of the invention and in which:

DETAILED DESCRIPTION OF PREFERRED EMBODIMENTS OF THE INVENTION

Figure 1:
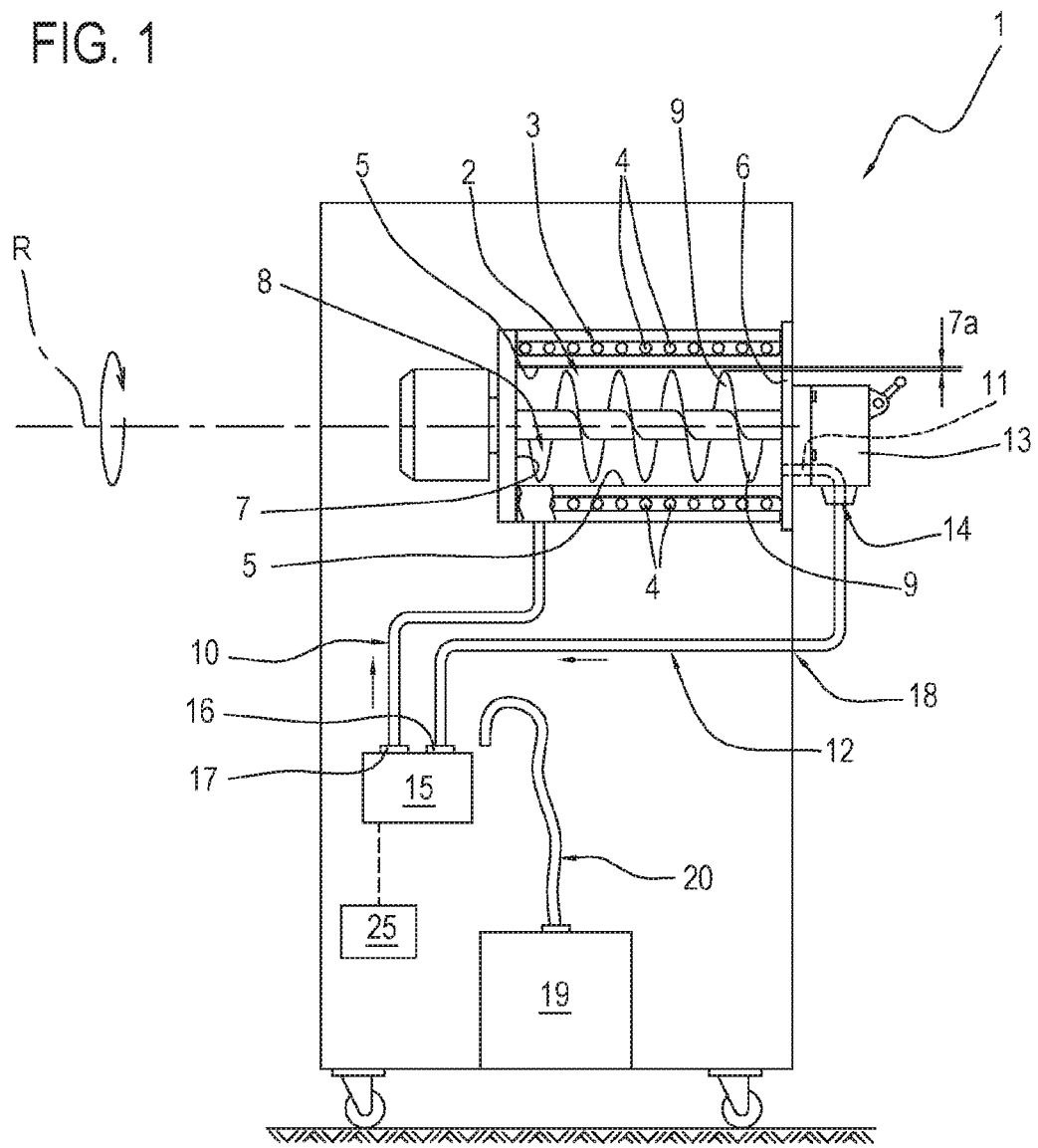
FIG. 1 shows a schematic front view of the machine of the invention according to a first embodiment thereof.

With reference to FIGS. 1 to 4, the numeral 1 denotes a machine for making and dispensing liquid, semi-liquid and/or semi-solid food products such as, for example, soft ice cream and the like.

Preferably, the machine 1 is used to make ice cream (or similar products) and, more specifically what is generally known as "soft ice cream".

The machine 1 comprises a cylinder 2 for containing and processing basic products, means 3 for heating and cooling the cylinder 2, wrapped around at least part of the cylinder 2.

Since the basic product is processed in the containment and processing cylinder 2 until it has the consistency of ice cream, the cylinder 2 also acts as a mixing and cooling cylinder.

The heating and cooling means 3 comprise coils 4 in which a heat exchange fluid flows.

More precisely, the cylinder 2 has a leading end wall 6, a trailing end wall 7 and a perimeter side wall 5 joining the trailing end wall 7 to the leading end wall 6.

Preferably, the heating and cooling means 3 are wrapped around at least part of the side wall 5 of the cylinder 2.

The machine 1 comprises a mixer unit 8 positioned inside the cylinder 2 and able to mix the basic products while they are being processed.

The mixer unit 8 rotates about its axis of rotation R.

More specifically, the axis R is horizontal.

In an alternative embodiment not illustrated, the cylinder 2 defines a tank for containing and processing the basic products and internally comprising a mixer unit 8 which rotates about its axis of rotation R which, in this case, is vertical.

The mixer unit 8 comprises one or more blades 9 which extend in a direction substantially transversal to the axis of rotation R of the mixer 8 itself.

Preferably, the blades 9 extend towards the side wall 5 of the cylinder 2 in such a way as to define a clearance gap 7a for the basic products to pass through.

Preferably, the clearance gap 7a is limited in cross section size so as to prevent the basic product from sticking to the side wall 5 of the cylinder 2 during processing.

The machine 1 comprises at least a supply duct 10 for supplying the products into the containment and processing cylinder 2 and at least a dispensing duct 11 for withdrawing the food products from the cylinder 2.

The supply duct 10 and the dispensing duct 11 extend from the cylinder 2 and outwardly therefrom.

Preferably, the supply duct 10 and the dispensing duct 11 extend from the side wall 5 and from the leading end wall 6 of the cylinder 2, respectively.

Alternatively, both the supply duct 10 and the dispensing duct 11 extend from the side wall 5 of the cylinder 2.

According to the invention, the machine 1 comprises means 12 for recirculating the products contained in the containment and processing cylinder 2 which is able to withdraw the products from the cylinder 2 through the dispensing duct 11 and to return them into the cylinder 2 through the supply duct 10.

Advantageously, in addition to the action of the mixer unit 8, the recirculation means 12 apply a further stirring action to the basic products inside the processing cylinder 2.

This prevents the basic products being processed in the cylinder 2 from sticking to the wall 5 thereof, especially during high temperature cycles such as, for example, the pasteurization cycle.

According to the invention, the machine comprises a removable container 19 for feeding basic products and provided with a product infeed channel 30 and a product outfeed channel 31.

Figure 4:
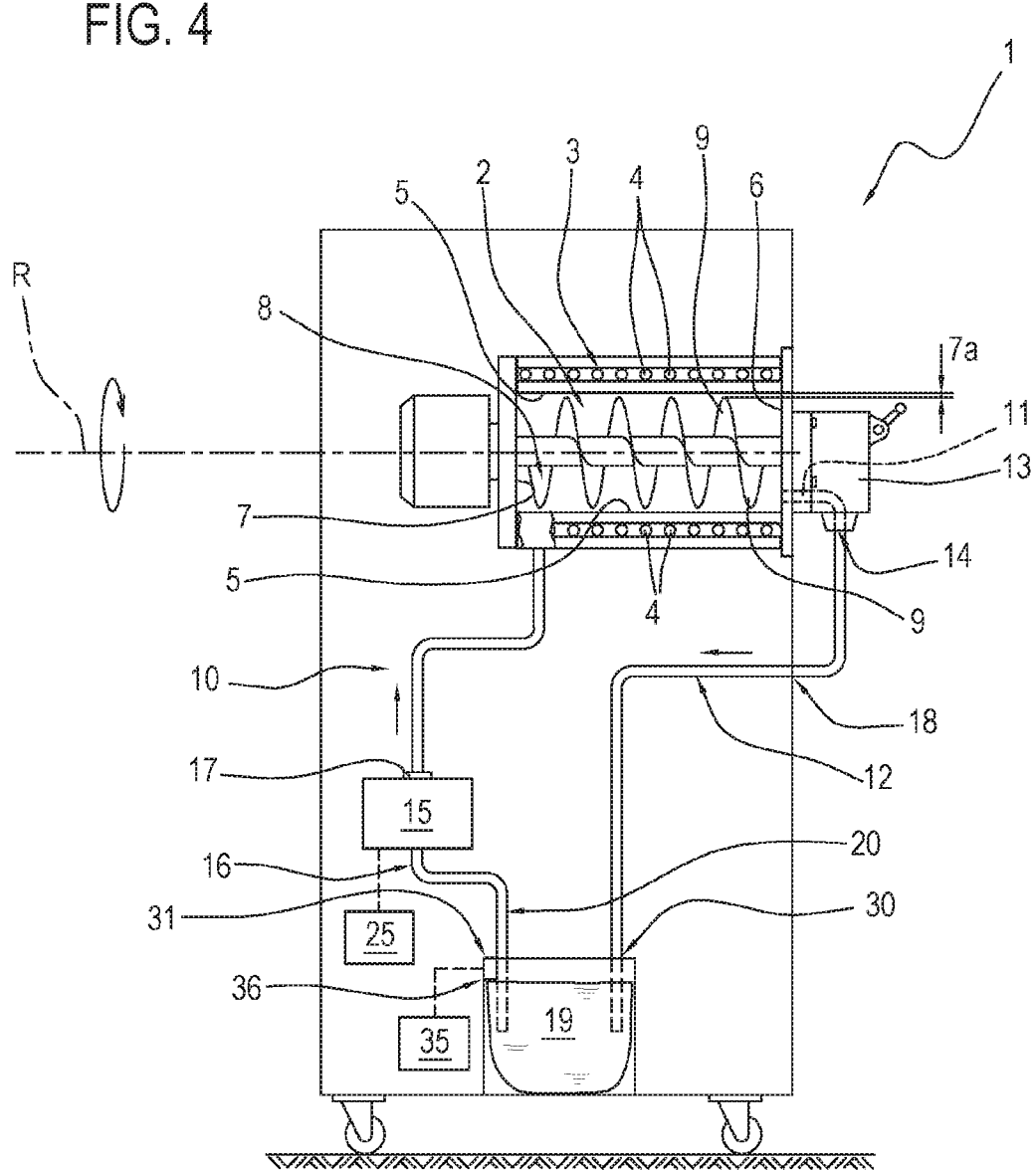
FIG. 4 shows a schematic front view of the machine of the invention according to a fourth embodiment thereof.

This container is preferably a container of the type known as "bag in box" (as illustrated in FIG. 4).

The infeed channel 30 is connected, in use, to the dispensing duct 11 and the outfeed channel 31 is connected, in use, to the supply duct 10 in order to allow recirculating the product between the containment cylinder 2 and the removable container 19.

That way, recirculation is effected between the containment cylinder 2 and the removable container 19 so that the contents of the removable container 19 undergo what is known as "recycling" pasteurization.

That means it is not necessary to disconnect the removable container 19 from the machine (that is, from the cylinder 2) to allow the basic mix inside the removable container 19 to be pasteurized.

The machine 1 comprises a dispensing tap 13 for withdrawing the food products from the cylinder 2. The tap 13 has a product dispensing outlet 14.

The dispensing tap 13 is connected to the dispensing duct 11 of the cylinder 2.

In the second embodiment, the recirculation means 12 for recirculating the products contained in the cylinder 2 withdraw the products from the cylinder 2 through the dispensing duct 11 and return them into the cylinder 2 through the supply duct 10.

The recirculation means 12 comprise a pump 15 having an infeed section 16 and a delivery section 17.

Advantageously, the pump 15 is a peristaltic pump.

Preferably, recirculation performed by the recirculation means 12 is continuous.

Preferably, in the embodiment illustrated in FIG. 4, the recirculation means 12 perform continuous recirculation between the removable container 19 and the cylinder 2.

Alternatively, recirculation performed by the recirculation means is intermittent.

The continuous or intermittent recirculation mode depends on the operating mode of the pump 15.

In the embodiment illustrated in FIG. 1, the delivery section 17 is connected to the supply duct 10 and the infeed section 16 is connected to the dispensing duct 11.

In a first variant embodiment, the infeed section 16 is connected to the dispensing duct 11 through the dispensing tap 13, in particular through the dispensing outlet 14 thereof, as illustrated in FIG. 1.

Figure 2:
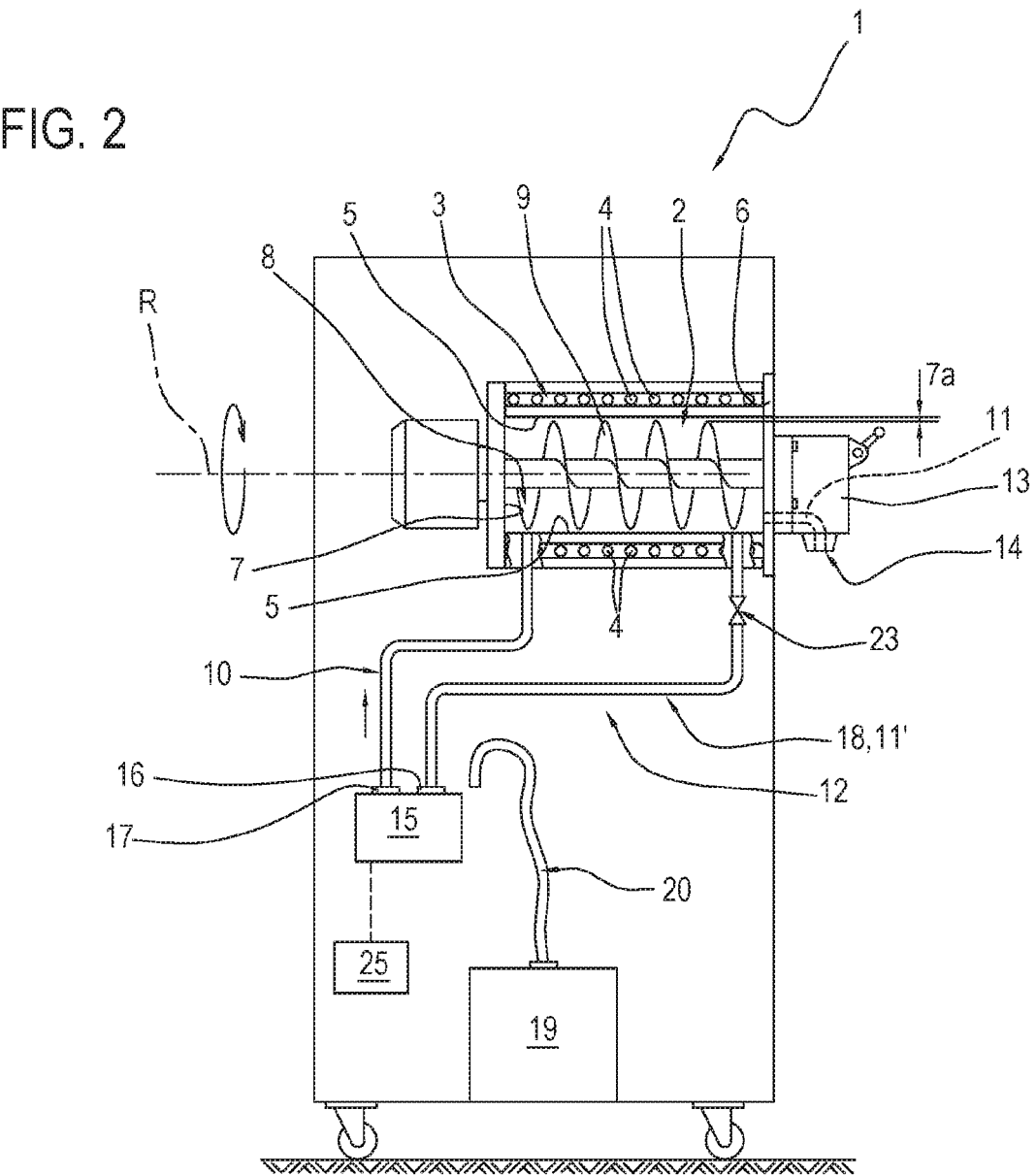
FIG. 2 shows a schematic front view of the machine of the invention according to a second embodiment thereof.

In a second variant embodiment, the infeed section 16 is connected directly to the dispensing duct 11, as illustrated in FIG. 2.

Advantageously, the machine 1 comprises a duct 18 for connecting the infeed section 16 of the pump 15 to the dispensing duct 11.

In the second embodiment, illustrated in FIG. 2, the connecting duct 18 leads into the cylinder 2, more specifically through the perimeter side wall 5.

In this embodiment, the connecting duct 18 comprises a shutoff valve 23 capable of opening the duct 18, during recirculation of the basic products.

In this embodiment, the connecting duct 18 acts as dispensing duct 11'.

It should be noted that in soft ice cream machines, the basic products to be fed into the cylinder 2 to make the ice cream are stored in dedicated containers 19.

Preferably, but not necessarily, the containers 19 are of the "bag in box" type, that is to say, they consist of a hard container and a soft container placed inside the hard container and containing the basic products.

The machine 1 comprises a duct 20 for sucking in the basic products to be fed into the containment and processing cylinder 2.

The pump 15 is designed to withdraw the basic products from the container 19 through the suction duct 20 and to transfer the same into the containment and processing cylinder 2 through the supply duct 10.

According to the invention, the infeed section 16 of the pump 15 is connectable to the suction duct 20 and to the dispensing duct 11 of the cylinder 2, alternately.

The connection between the infeed section 16 of the pump 15 and the suction duct 20 and dispensing duct 11 changes as a function of the steps in the ice cream production process.

More specifically, to transfer the basic products from the container 19 to the cylinder 2 by means of the pump 15, the infeed section 16 of the pump 15 is connected to the suction duct 20.

During the cycle when the basic products in the cylinder 2 are pasteurized, the infeed section 16 of the pump 15 is connected to the dispensing duct 11.

Figure 3:
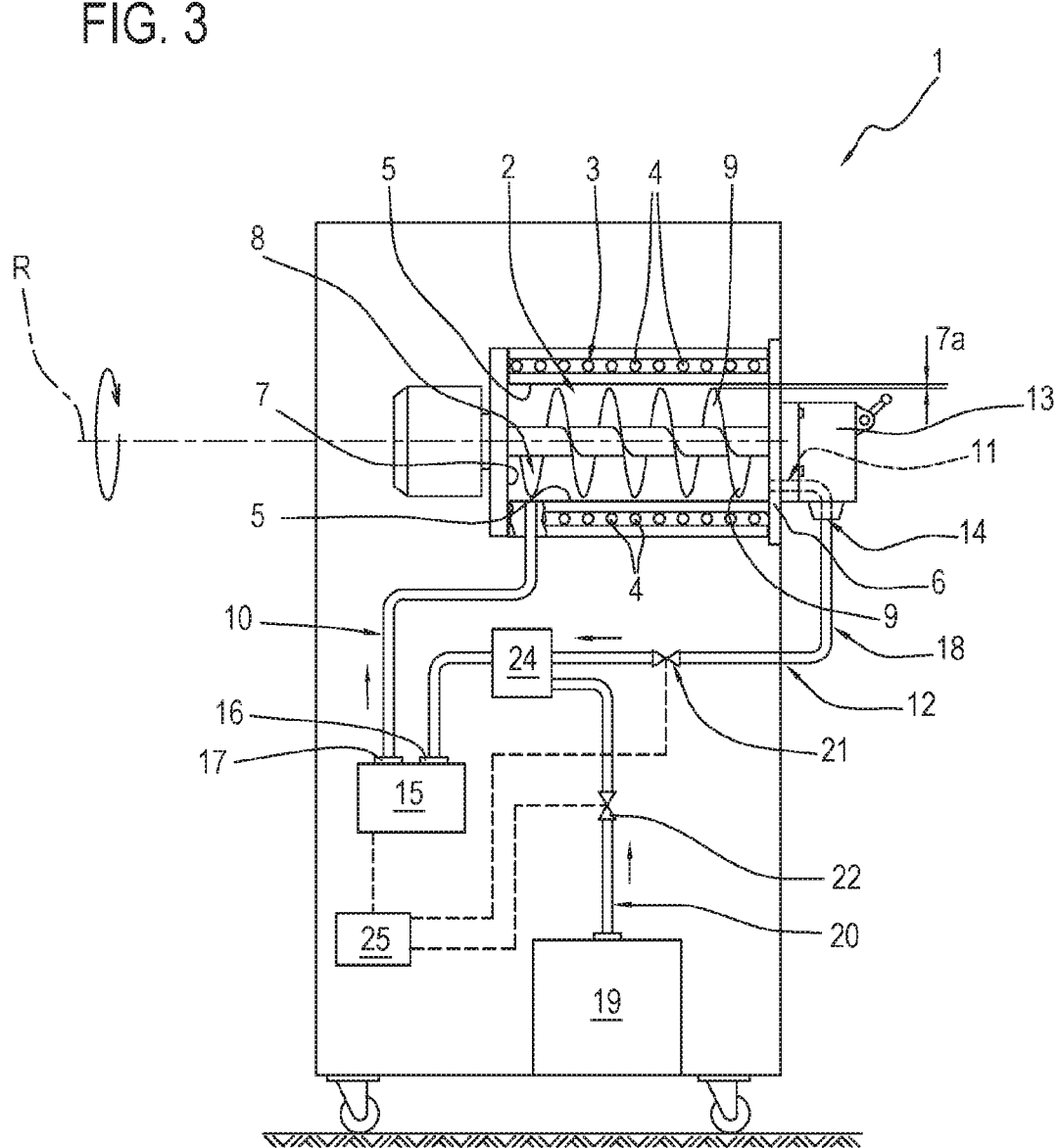
FIG. 3 shows a schematic front view of the machine of the invention according to a third embodiment thereof.

In a third embodiment, illustrated in FIG. 3, the pump 15 comprises a common by-pass section 24 upstream of the infeed section 16 and connected thereto.

The connecting duct 18 and the suction duct 20 merge into the common by-pass section 24.

The connecting duct 18 and the suction duct 20 are equipped with a first and a second shutoff valve 21 and 22, respectively.

In this embodiment, acting on the first shutoff valve 21 causes the connecting duct 18 to close, so that the pump 15 sucks the basic products through the suction duct 20 and fills the cylinder 2 through the supply duct 10.

Once the cylinder 2 is full, the suction duct 20 can be closed by acting on the second shutoff valve 22 and the connecting duct 18 can be opened by acting on the first shutoff valve 21.

The machine 1 comprises a control unit 25 logically connected to the first and second shutoff valves 21 and 22 and capable of opening and closing these valves 21 and 22 during the operation of the machine 1.

That way, the pump 15 recirculates the products inside the cylinder 2 by withdrawing them through the dispensing duct 11 and returning them into the cylinder through the supply duct 10, preferably continuously.

In use, the pump 15 transfers the basic products from the container 19 to the tank 2 (that is, the cylinder 2) until the latter is full.

When the cylinder 2 is full, the products inside the cylinder 2 itself (and, in the embodiment illustrated in FIG. 4, the basic products inside the container 19) undergo the pasteurization cycle.

During the pasteurization cycle, the recirculation means 12 withdraw the products being processed from the cylinder 2 through the dispensing duct 11 and return them into the cylinder 2 through the supply duct 10. This prevents the products being processed from sticking to the walls 5, 6 and 7 of the cylinder 2 which reach temperatures between 65° and 85° C.

More specifically, the recirculation means 12 stop the products being processed from sticking to the walls 5, 6, 7 of the cylinder 2, wrapped in the heating and cooling means 3, in particular the side wall 5.

The recirculation means 12 also stop the products being processed from sticking to the leading end wall 6 and the trailing end wall 7 of the cylinder 2.

The recirculation means 12 apply a stirring action to the products being processed, added to the stirring action applied by the mixer unit 8.

More specifically, in the embodiment illustrated in FIG. 4, the recirculation means 12 withdraw the products from the removable container 19 and make them recirculate through the cylinder 2 (preferably by means of a pump 15).

Advantageously, the contents of the removable container 19 can thus be pasteurized without disconnecting the container from the cylinder 2.

When the pasteurization cycle is over, the products being processed undergo a cooling cycle and a storage cycle, thus obtaining a finished product, that is, ice cream, from the basic products.

The pump 15 is activated by a control unit 25 as a function of the operating cycle of the machine 1.

During the cooling and storage cycle, the heating and cooling means 3 cause the heat exchange fluid to flow in the coils 4 in order to remove heat from the cylinder 2, thereby cooling it.

Usually, the heating and cooling means 3 cool the cylinder 2 to a temperature of around 4° C. which is also the ice cream storage temperature.

At this point, the ice cream inside the cylinder 2 can be withdrawn through the dispensing tap 13.

According to another aspect, the machine 1 comprises a memory designed to save a piece of information relating to the opening time of the removable container 19.

The term "opening time" is used to denote a piece of time information indicating when the removable container 19 was opened, that is to say, when it was first used in the machine.

For example, the piece of time information may comprise one or more of the following pieces of information:
the date the removable container 19 was opened;
the time the removable container 19 was opened;
the interval of time elapsed since the removable container 19 was opened.

In effect, it should be noted that the infeed channel 30 and the outfeed channel 31 are initially closed: they are opened (perforated) when the removable container is used for the first time in the machine 1.

According to this aspect, it should be noted that the machine comprises a memory control unit 35 (which may or may not form part of the control unit 25 of the machine) configured to measure the time the removable container 19 is connected to the cylinder 2.

The control unit 35 updates the opening time information when the removable container 19 is connected to the cylinder 2 for the first time (for example, saving the date and/or the time of opening or starting a time count indicating the length of time elapsed since the container 19 was opened).

Also according to this aspect, the control unit 35 is 6 configured to provide an indication if the opening time of the removable container 19 in the machine is greater than a preset value (this value preferably corresponding to 24 hours or 72 hours).

It should be noted that the preset value is such that if the product inside the removable container 19 is used—for making the finished product—within this preset value, no food safety risk arises.

The preset value is thus selected to guarantee the food safety of the product made by the machine 1.

According to this aspect, the machine 1 comprises an indication unit (for example, a display or sound means) connected to the control unit 35 to provide an indication (visible and/or audible) if the opening time of the removable container 19 in the machine is greater than a preset value (also saved in the control unit 35 or in the memory itself).

Preferably, the control unit 35 comprises a sensor 36 for detecting when the removable container 19 is connected to the cylinder 2.

Preferably, in one embodiment, the control unit 35 comprises a level sensor for detecting the level of product in the removable container 19 and for establishing, based on the level detected, when said removable container 19 is connected to the cylinder 2 (in such a way as to update the opening time in the memory, if the removable container 19 is connected for the first time to the machine 1, that is, to the cylinder 2.

In another embodiment, the machine 1 comprises a connector for connecting the removable container 19 to the cylinder 2.

Preferably, the connector is configured to be connected to the infeed channel 30 and to the outfeed channel 31 of the removable container 19.

According to this aspect, the control unit 35 comprises a sensor, associated with the connector or with the removable container 19, for detecting a connection of the removable container 19 to the connector corresponding to a condition of connection of the removable container 19 to the cylinder 2.

Also defined according to the invention is a method for making and dispensing liquid, semi-liquid and/or semi-solid food products starting from basic products.

The method comprises:
a step of preparing at least a cylinder 2 for containing and processing basic products, means 3 for heating and cooling the cylinder 2, wrapped around at least part of the cylinder 2, and a mixer unit 8 positioned inside the cylinder 2 which is able to mix the basic products during their processing;

a step of preparing at least a supply duct 10 for supplying the products into the cylinder 2 and at least a dispensing duct 11 for withdrawing the food products from the cylinder 2;

a step of recirculating the products contained in the containment and processing cylinder 2.

It should be noted that the recirculating step comprises a step of withdrawing the products from the cylinder 2 through the dispensing duct 11, 11' and a step of returning them into the cylinder 2 through the supply duct 10.

The method, for the embodiment shown in FIG. 4, comprises:

a step of preparing at least a cylinder 2 for containing and processing basic products, means 3 for heating and cooling the cylinder 2, wrapped around at least part of the cylinder 2, and a mixer unit 8 positioned inside the cylinder 2 which is able to mix the basic products during their processing;

a step of preparing a removable container 19 for feeding basic products and provided with an infeed channel 30 and an outfeed channel 31;

a step of preparing at least a supply duct 10 for supplying the products into the cylinder 2 and at least a dispensing duct 11 for withdrawing the food products from the cylinder 2, the method being characterized in that it comprises at least in use a step of recirculating the products contained in the containment and processing cylinder 2;

a step of withdrawing the products from the cylinder 2 through the dispensing duct 11, 11';

a step of returning the products into the cylinder 2 through the supply duct 10;

a step of connecting the infeed channel 30 of the removable container 19 to the dispensing duct 11, 11' and connecting the outfeed channel 31 of the removable container 19 to the supply duct 10 to allow recirculating the product between the containment cylinder 2 and the removable container 19;

a step of recirculating the products between the containment cylinder 2 and the removable container 19 through the dispensing duct 11, 11', the supply duct 10, the infeed channel 30 and the outfeed channel 31.

The method comprises the step of transferring the basic products (from the removable container 19) into the containment and processing cylinder 2 followed by the step of recirculating the products inside the containment and processing cylinder 2 (between the cylinder 2 and the container 19 in the embodiment shown in FIG. 4).

Preferably, the step of recirculating the products between the containment and processing cylinder 2 and the removable container 19 is performed continuously, for a preset time interval.

The method relating to FIG. 4 comprises a step of preparing a removable container 19 for feeding the basic products and provided with an infeed channel 30 and an outfeed channel 31.

Preferably, the removable container 19 is of the type known as "bag in box".

It should be noted that if the basic products are in containers 19 of the "bag in box" type, when the step of transferring the basic products into the containment and processing cylinder 2 is over, the method comprises a step of disconnecting the suction duct 20 from the container 19.

That means, advantageously, that the container 19 can be kept separately from the machine 1.

Advantageously, therefore, the container 19 can be stored in a refrigerator to allow the basic product to be stored for re-use at a later stage. The recirculating step comprises a step of withdrawing the products from the cylinder 2 through the dispensing duct 11 and a step of returning them into the cylinder 2 through the supply duct 10.

Alternatively, the step of recirculating the products contained in the containment and processing cylinder 2 comprises the step of withdrawing the products from the cylinder 2 through the dispensing tap 13 and the step of returning them into the cylinder 2 through the supply duct 10.

The step of recirculating the products contained in the containment and processing cylinder 2 is preferably performed during the pasteurization cycle of the basic products.

This method comprises a step of connecting the recirculation means 12 to the supply duct 10 and to the dispensing duct 11 of the containment and processing cylinder 2, defining a circuit for the recirculation of the products inside the cylinder 2.

More specifically, the method comprises a step of disconnecting the infeed section 16 of the pump 15 from the container 19 of the basic products and connecting the infeed section 16 of the pump 15 to the dispensing duct 11 by means of at least one connecting duct 18.

To disconnect the infeed section 16 of the pump 15 from the container 19 the method comprises a step of disconnecting the suction duct 20 from the infeed section 16 of the pump 15.

Thus, in this step, the container 19 and the related suction duct 20 are detached from the pump 15.

If necessary, the container 19 and the related suction duct 20 can be kept separately from the machine 1. Alternatively, the method comprises a step of disconnecting the infeed section 16 of the pump 15 from the suction duct 20 of the basic products and connecting the infeed section 16 of the pump 15 to the dispensing tap 13 by means of at least one connecting duct 18. More specifically, the infeed section 16 of the pump 15 is connected to the dispensing outlet 14 of the dispensing tap 13.

According to another aspect, the method comprises:

a step of saving a piece of time information (opening time) indicating when the removable container 19 was opened;

a step of comparing said piece of time information saved with a preset value, for providing an indication if the time interval since opening is greater than the preset value.

According to this aspect, the method preferably comprises a step of detecting, by means of a sensor, when the removable container 19 is connected to the cylinder 2.

Advantageously, according to this aspect, it is possible to know at any time when the container was opened (that is, the time elapsed since opening): thus, the machine user knows immediately how long the removable container has been open and, based on this knowledge, can decide whether to dispose of the removable container 19 or use up its contents before they spoil.

Advantageously, during the pasteurization cycle, the basic products are stirred by the mixer unit 8 and recirculated by the recirculation means 12, thereby preventing them from sticking to the walls of the cylinder 2, in particular the side wall 5 in contact with the coils 4, and consequently the products being processed are prevented from burning.

That means the machine 1 produces a better quality ice cream than prior art machines because the recirculation means 12 improve the homogenization of the basic product mix during pasteurization.

Described below are some aspects applicable to one or more of the embodiments of the machine or of the method described above.

According to another aspect, the machine comprises an indication unit, connected to the control unit 35 for providing an indication when the removable container 19 has been open for a length time, calculated starting from the opening time saved in the memory, greater than a preset value.

According to yet another aspect, the control unit 35 comprises a level sensor for detecting the level of product in the removable container 19 and for establishing, based on the level detected, when said removable container 19 is connected to the cylinder 2.

The invention claimed is:

1. A machine for making and dispensing liquid, semi-liquid and/or semi-solid food products, comprising:
 a removable container including a first volume of liquid, semi-liquid and/or semi-solid food product;
 a containment and processing unit operably connected to the removable container, the containment and processing unit including a containment and processing cylinder including a side wall encompassing a chamber with a cylindrical internal wall;
 a dispensing tap operably connected to the containment and processing cylinder to dispense a frozen food product; and
 a heating and cooling device disposed at a heating location of the machine to heat a second volume of liquid, semi-liquid and/or semi-solid food product, wherein the heating location is operatively connected to the containment and processing cylinder for heating the second volume through the cylindrical internal wall;
 a connecting duct operably connectable to the containment and processing cylinder; and
 a supply duct operably connected to the containment and processing cylinder,
 a pump including an outlet connected to the containment and processing cylinder via the supply duct for delivering liquid, semi-liquid and/or semi-solid food product to the containment and processing cylinder, wherein the pump includes a single inlet;
 a suction duct selectively connecting the removable container of the machine to the single inlet and thereby connecting the removable container to the containment and processing cylinder via the pump and the supply duct;
 the supply duct selectively connectable to the removable container via the suction duct for dispensing operations of the machine, or to the connecting duct when the suction duct is physically disconnected from the single inlet and the connecting duct is physically connected to the single inlet, to define a heat treatment circuit for the heating of the second volume of liquid, semi-liquid and/or semi-solid food product disposed at the heat treatment circuit, the heat treatment circuit including the containment and processing cylinder, the pump, the supply duct and the connecting duct and omitting the removable container, the pump being actuatable to cause the second volume of the liquid, semi-liquid and/or semi-solid food product to circulate through the heat treatment circuit for the periodic heat treatment of the second volume of liquid, semi-liquid and/or semi-solid food product;
 the removable container being reconnectable to the containment and processing cylinder when not performing the heating of the second volume of liquid, semi-liquid and/or semi-solid food product, when the suction duct is physically connected to the single inlet and the connecting duct is physically disconnected from the single inlet, wherein the single inlet is physically connected to only one of the suction duct and the connecting duct at a time while being physically disconnected and spaced apart from the other of the suction duct and the connecting duct at that time;
 wherein, while the second volume of liquid, semi-liquid and/or semi-solid food product is being heat treated, the first volume of liquid, semi-liquid and/or semi-solid food product in the removable container is physically isolated from an interior of the heat treatment circuit while the removable container containing the first volume of liquid, semi-liquid and/or semi-solid food product is maintained within the machine;
 wherein the connecting duct includes a shutoff valve configured to open the connecting duct during the heat treatment;
 a control unit with a memory configured to save opening time information relating to an opening time of the removable container, the opening time designating a time when the removable container is first connected to the containment and processing cylinder, the control unit also configured to determine an elapsed time since the opening time and to provide an indication if the elapsed time is greater than a pre-set value.

2. The machine of claim 1, wherein at least a portion of the side wall is configured to transfer heat to the chamber.

3. The machine of claim 2, wherein the heating and cooling device is disposed in contact with the at least the portion of the side wall.

4. The machine of claim 1, wherein the heating and cooling device is configured to heat the second volume of liquid, semi-liquid and/or semi-solid food product to a heat treatment temperature.

5. The f machine of claim 4, wherein the heat treatment temperature is between 65-85 degrees Celsius.

6. A machine for making and dispensing liquid, semi-liquid and/or semi-solid food products, comprising:
 a containment and processing cylinder configured to freeze a flow of liquid, semi-liquid and/or semi-solid food product therethrough, the containment and processing cylinder including a side wall encompassing a chamber with a cylindrical internal wall; and
 a heating and cooling device operatively connected to the containment and processing cylinder to selectably heat the flow of liquid, semi-liquid and/or semi-solid food product to a heat treatment temperature through the cylindrical internal wall;
 a removable container;
 a connecting duct operably connectable to the containment and processing cylinder;
 a supply duct operably connected to the containment and processing cylinder;
 a pump including an outlet connected to the containment and processing cylinder via the supply duct for delivering liquid, semi-liquid and/or semi-solid food product to the containment and processing cylinder, wherein the pump includes a single inlet;
 a suction duct selectively connecting the removable container to the single inlet and thereby connecting the removable container to the containment and processing cylinder via the pump and the supply duct;
 the supply duct selectively connectable to the removable container via the suction duct for dispensing operations of the machine, or to the connecting duct, when the suction duct is physically disconnected from the single inlet and the connecting duct is physically connected to the single inlet, to define a heat treatment circuit for the heating the flow of liquid, semi-liquid and/or semi-solid food product at the heat treatment circuit, the heat treatment circuit including the containment and processing cylinder, the pump, the supply duct and the connecting duct and omitting the removable container, the pump being actuatable to cause the flow of liquid, semi-liquid and/or semi-solid food product to circulate through the heat treatment circuit for the periodic heat treatment of the flow of liquid, semi-liquid and/or semi-solid food product;

the removable container being reconnectable to the containment and processing cylinder when not performing the heating the flow of liquid, semi-liquid and/or semi-solid food product at the heat treatment circuit, when the suction duct is physically connected to the single inlet and the connecting duct is physically disconnected from the single inlet, wherein the single inlet is physically connected to only one of the suction duct and the connecting duct at a time while being physically disconnected and spaced apart from the other of the suction duct and the connecting duct at that time;

wherein, while the liquid, semi-liquid and/or semi-solid food product is being heat treated, basic product in the removable container is physically isolated from an interior of the heat treatment circuit while the removable container containing the basic product is maintained within the machine;

wherein the connecting duct includes a shutoff valve configured to open the connecting duct during the heat treatment;

a control unit with a memory configured to save opening time information relating to an opening time of the removable container, the opening time designating a time when the removable container is first connected to the containment and processing cylinder, the control unit also configured to determine an elapsed time since the opening time and to provide an indication if the elapsed time is greater than a pre-set value.

7. The machine of claim 6, wherein the heating and cooling device is in direct contact with the containment and processing cylinder.

8. The machine of claim 6, wherein at least a portion of the side wall is configured to transfer heat to the chamber.

9. The machine of claim 8, wherein the heating and cooling device is in direct contact with the at least a portion side wall.

10. The machine of claim 6, wherein the heat treatment temperature is between 65-85 degrees Celsius.

11. A method of performing a heat treatment cycle on a volume of liquid, semi-liquid and/or semi-solid food product in a machine for making and dispensing liquid, semi-liquid and/or semi-solid food products, comprising:

providing a pump including an outlet connected to a containment and processing unit of the machine via a supply duct for delivering liquid, semi-liquid and/or semi-solid food product to the containment and processing unit, wherein the pump includes a single inlet;

providing a suction duct connecting a removable container of the machine to the single inlet and thereby connecting the removable container to the containment and processing unit via the pump and the supply duct;

disconnecting the removable container from the containment and processing unit by physically disconnecting the suction duct from the single inlet;

connecting the containment and processing unit to the single inlet with a connecting duct;

providing the containment and processing unit portion with a containment and processing cylinder including a side wall encompassing a chamber with a cylindrical internal wall;

defining a heat treatment circuit including the containment and processing cylinder, the pump, the supply duct and the connecting duct;

performing a heat treatment cycle on liquid, semi-liquid and/or semi-solid food product disposed in the heat treatment circuit by:
  activating the pump to cause the liquid, semi-liquid and/or semi-solid food product disposed in the heat treatment circuit to circulate through the heat treatment circuit;
  heating the volume of liquid, semi-liquid and/or semi-solid food product to a heat treatment temperature within a first time duration at the containment and processing cylinder and heating the volume of liquid, semi-liquid and/or semi-solid food product through the cylindrical internal wall;
  holding the volume of liquid, semi-liquid and/or semi-solid food product at the heat treatment temperature for a second time duration; and after the performing the heat treatment cycle, physically disconnecting the connecting duct from the single inlet and physically reconnecting the suction duct to the single inlet to reconnect the removable container to the containment and processing cylinder, wherein the single inlet is physically connected to only one of the suction duct and the connecting duct at a time while being physically disconnected and spaced apart from the other of the suction duct and the connecting duct at that time;

wherein, while the liquid, semi-liquid and/or semi-solid food product is being heat treated, physically isolating basic product in the removable container from an interior of the heat treatment circuit while maintaining the removable container containing the basic product within the machine;

providing the connecting duct with a shutoff valve configured to open the connecting duct during the heat treatment cycle;

providing a control unit with a memory configured to save opening time information relating to an opening time of the removable container, the opening time designating a time when the removable container is first connected to the containment and processing cylinder, the control unit also configured to determine an elapsed time since the opening time and to provide an indication if the elapsed time is greater than a pre-set value.

12. A machine for making and dispensing a prepared food product including at least one chosen from a liquid, semi-liquid and semi-solid food product, comprising:

a container including a first volume of basic product;

a containment and processing cylinder for containing and processing the basic product into the prepared food product, the containment and processing cylinder operatively connected to the container, the containment and processing cylinder including a side wall encompassing a chamber with a cylindrical internal wall;

a heating and cooling device for heating a portion of the machine containing a second volume of at least one chosen from the basic product and the prepared product, wherein the heating and cooling device includes a thermally conductive portion positioned in operative engagement with the containment and processing cylinder to transfer heat to the containment and processing cylinder by thermal conduction;
a supply duct for supplying the basic product into the containment and processing cylinder;
a connecting duct for withdrawing the at least one chosen from the basic food product and the prepared food product from the containment and processing cylinder;
a recirculation circuit for recirculating the at least one chosen from the basic product and the prepared food product through the containment and processing cylinder by withdrawing the at least one chosen from the basic product and the prepared food product from the containment and processing cylinder through the connecting duct and returning the at least one chosen from the basic product and the prepared food product into the containment and processing cylinder through the supply duct, the recirculation circuit including the supply duct, the connecting duct, the containment and processing cylinder and a pump operatively connected between the supply duct and the connecting duct for recirculating the at least one chosen from the basic product and the prepared food product through the containment and processing cylinder during a time period where the recirculation circuit is heated by the heating and cooling device;
the pump including an outlet connected to the containment and processing cylinder via the supply duct for delivering product to the containment and processing cylinder, wherein the pump includes a single inlet;
a suction duct selectively connecting the container to the single inlet and thereby connecting the container to the containment and processing cylinder via the pump and the supply duct;
the supply duct selectively connectable to the container via the suction duct for dispensing operations of the machine, or to the connecting duct, when the suction duct is physically disconnected from the single inlet and the connecting duct is physically connected to the single inlet, to define the recirculation circuit for periodic heat treatment of the second volume of at least one chosen from the basic product and the prepared product disposed at the recirculation circuit, the recirculation circuit including the containment and processing cylinder, the pump, the supply duct and the connecting duct and omitting the container, the pump being actuatable to cause the second volume of at least one chosen from the basic product and the prepared product to circulate through the heat treatment circuit for the periodic heat treatment of the second volume of at least one chosen from the basic product and the prepared product;
the container being reconnectable to the containment and processing cylinder when not performing the periodic heat treatment, when the suction duct is physically connected to the single inlet and the connecting duct is physically disconnected from the single inlet, wherein the single inlet is physically connected to only one of the suction duct and the connecting duct at a time while being physically disconnected and spaced apart from the other of the suction duct and the connecting duct at that time;
wherein, while the second volume of at least one chosen from the basic product and the prepared product is being heat treated, the first volume of basic product in the container is physically isolated from an interior of the recirculation circuit while the container containing the first volume of basic product is maintained within the machine;
wherein the connecting duct includes a shutoff valve configured to open the connecting duct during the heat treatment;
a control unit with a memory configured to save opening time information relating to an opening time of the first volume of basic product, the opening time designating a time when the first volume of basic product is first connected to the containment and processing cylinder, the control unit also configured to determine an elapsed time since the opening time and to provide an indication if the elapsed time is greater than a pre-set value.

13. The machine according to claim 12, wherein at least a portion of the side wall of the containment and processing cylinder is configured to transfer heat to the chamber.

14. The machine according to claim 12, wherein the heating and cooling device is configured to heat the second volume of the at least one chosen from the basic product and the prepared product to a temperature of between 65° and 85° C.

15. The machine according to claim 12,
wherein the heating and cooling device is positioned adjacent at least one chosen from the supply duct and the connecting duct to transfer heat to the at least one chosen from the supply duct and the connecting duct by thermal conduction.

16. The machine according to claim 15, and further comprising a dispensing tap fluidly connected to the containment and processing cylinder for dispensing the prepared food product from the containment and processing cylinder.

17. A method for performing a thermal cycle on a volume of product in a machine for making and dispensing a prepared food product including at least one chosen from a liquid, semi-liquid and semi-solid food product, comprising:
providing a containment and processing cylinder for containing and processing a basic product into the prepared food product, the containment and processing cylinder including a side wall encompassing a chamber with a cylindrical internal wall;
heating a portion of the cylindrical internal wall for heating the at least one chosen from the basic product and the prepared food product;
providing a pump including an outlet connected to the containment and processing cylinder via a supply duct for delivering the at least one chosen from the basic product and the prepared food product to the containment and processing cylinder, wherein the pump includes a single inlet;
providing a suction duct connecting a removable container of the machine to the single inlet and thereby connecting the removable container to the containment and processing cylinder via the pump and the supply duct;
disconnecting the removable container from the containment and processing cylinder by physically disconnecting the suction duct from the single inlet;
connecting the containment and processing cylinder to the single inlet with a connecting duct;
defining a heat treatment circuit including the containment and processing cylinder, the pump, the supply duct and the connecting duct;
performing the thermal cycle by heating the at least one chosen from the basic product and the prepared food product in the heat treatment circuit to a temperature of between 65° and 85° C., the performing the thermal cycle including activating the pump to cause the at least one chosen from the basic product and the prepared food product in the heat treatment circuit to circulate through the heat treatment circuit;

after the performing the heat treatment cycle, physically disconnecting the connecting duct from the single inlet and physically reconnecting the suction duct to the single inlet to reconnect the removable container to the containment and processing cylinder, wherein the single inlet is physically connected to only one of the suction duct and the connecting duct at a time while being physically disconnected and spaced apart from the other of the suction duct and the connecting duct at that time;

wherein, while the at least one chosen from the basic product and the prepared food product is being heat treated, physically isolating basic product in the removable container from an interior of the heat treatment circuit while maintaining the removable container containing the basic product within the machine;

providing the connecting duct with a shutoff valve configured to open the connecting duct during the thermal cycle;

providing a control unit with a memory configured to save opening time information relating to an opening time of the removable container, the opening time designating a time when the removable container is first connected to the containment and processing cylinder, the control unit also configured to determine an elapsed time since the opening time and to provide an indication if the elapsed time is greater than a pre-set value.

* * * * *